United States Patent
Kamobe et al.

(10) Patent No.: US 9,318,265 B2
(45) Date of Patent: Apr. 19, 2016

(54) MULTILAYER CERAMIC CAPACITOR PROVIDED WITH EXTERNAL ELECTRODES PARTIALLY COVERED BY SOLDER NON-ADHESION FILM

(71) Applicant: TAIYO YUDEN CO., LTD., Taito-ku, Tokyo (JP)

(72) Inventors: Takehiko Kamobe, Takasaki (JP); Katsunosuke Haga, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 38 days.

(21) Appl. No.: 14/142,557

(22) Filed: Dec. 27, 2013

(65) Prior Publication Data

US 2014/0198427 A1 Jul. 17, 2014

(30) Foreign Application Priority Data

Jan. 11, 2013 (JP) .................. 2013-003475

(51) Int. Cl.
*H01G 4/30* (2006.01)
*H01G 4/232* (2006.01)
*H01G 4/012* (2006.01)
*H01G 4/12* (2006.01)

(52) U.S. Cl.
CPC .................. *H01G 4/30* (2013.01); *H01G 4/232* (2013.01); *H01G 4/2325* (2013.01); *H01G 4/012* (2013.01); *H01G 4/12* (2013.01)

(58) Field of Classification Search
CPC ....... H01G 4/30; H01G 4/2325; H01G 4/232; H01G 4/012; H01G 4/12
See application file for complete search history.

(56) References Cited

U.S. PATENT DOCUMENTS

| | | | |
|---|---|---|---|
| 2005/0094350 A1* | 5/2005 | Kobayashi et al. | 361/306.3 |
| 2013/0057112 A1* | 3/2013 | Shirakawa et al. | 310/311 |
| 2013/0279071 A1* | 10/2013 | Okamoto et al. | 361/301.4 |
| 2013/0279072 A1* | 10/2013 | Okamoto et al. | 361/301.4 |

FOREIGN PATENT DOCUMENTS

| | | | |
|---|---|---|---|
| JP | H02-137023 U | | 11/1990 |
| JP | 1993-062003 U | | 8/1993 |
| JP | 05243074 A | * | 9/1993 |
| JP | H06-084687 A | | 3/1994 |
| JP | H07-037753 A | | 2/1995 |
| JP | H10-270288 A | | 10/1998 |
| JP | 11251177 A | * | 9/1999 |
| JP | 11260653 A | * | 9/1999 |
| JP | 2002359103 A | * | 12/2002 |

(Continued)

OTHER PUBLICATIONS

An Office Action issued by the Korean Patent Office, mailed Oct. 7, 2014, for Korean counterpart application No. 10-2013-0147002.

(Continued)

*Primary Examiner* — David M Sinclair
(74) *Attorney, Agent, or Firm* — Law Office of Katsuhiro Arai

(57) ABSTRACT

A multilayer ceramic capacitor whose external electrodes are each provided with a solder non-adhesion film made of material to which solder does not adhere, in a manner continuously covering the entire surface of the end face, and optionally the entire surface of the curved face thereof. The multilayer ceramic capacitor, with certainty, allows for suppression of noise accompanying electrostriction.

8 Claims, 5 Drawing Sheets

(56) References Cited

FOREIGN PATENT DOCUMENTS

| | | |
|---|---|---|
| JP | 2004-273935 A | 9/2004 |
| JP | 2006-128283 A | 5/2006 |
| JP | 2013-235928 A | 11/2013 |

OTHER PUBLICATIONS

A Notice of Reasons for Refusal issued by Japanese Patent Office, mailed Nov. 17, 2014, for Japanese counterpart application No. 2013-003475.

* cited by examiner

US 9,318,265 B2

MULTILAYER CERAMIC CAPACITOR PROVIDED WITH EXTERNAL ELECTRODES PARTIALLY COVERED BY SOLDER NON-ADHESION FILM

FIELD OF THE INVENTION

The present invention relates to a multilayer ceramic capacitor.

DESCRIPTION OF THE RELATED ART

FIG. 1 shows a conventional multilayer capacitor 100 installed on a substrate 201.

A multilayer ceramic capacitor 100 (hereinafter simply referred to as "capacitor 100") comprises a dielectric chip 101 made of dielectric ceramics and having a roughly rectangular shape, as well as external electrodes 102 respectively positioned on the opposing ends thereof, and has a roughly rectangular shape as a whole. The dielectric chip 101 has multiple built-in internal electrode layers (not illustrated) that do not contact each other, where ends of parts of the multiple internal electrode layers (odd-numbered layers from the top) are connected to one external electrode 102, while ends of the other parts (even-numbered layers from the top) are connected to the other external electrode 102.

To install this capacitor 100 onto a substrate 201, the capacitor 100 is installed in such a way that one side face (contacting surface of roughly rectangular shape) of each external electrode 102 comes in contact with a solder paste applied to each pad 202 on the substrate 201, after which the solder paste is melted by means of reflow soldering or other method of heat treatment and then cured, to join each external electrode 102 to the pad 202 via the solder 301. Note that the pad 202 on the substrate 201 has a roughly rectangular profile slightly larger than the contacting surface of each external electrode 102.

Since the molten solder paste behaves in a manner rising on the end face 102*a* and side face (side face in the width direction, not shown in this cross sectional view) of each external electrode 102 during the heat treatment, a solder fillet 301*a* of a specified height is formed on the end face side of each external electrode 102 of the installed capacitor 100, as shown in FIG. 1.

Incidentally, if the dielectric chip 101 undergoes electrostriction (i.e., the lateral dimension of the dielectric chip 101 in FIG. 1 decreases while its vertical dimension increases (refer to the black arrows), followed by restoration of the original dimensions, with this process being repeated) due to application of voltage, particularly alternating current voltage, to the installed capacitor 100 as shown in FIG. 1, the substrate 201 may repeatedly warp due to electrostriction (refer to the two-dot chain lines) and resume its original shape to generate vibration, and consequently produce so-called noise due to this vibration.

Particularly when a solder fillet 301*a* is formed on the end face side of each external electrode 102 of the installed capacitor 100, as shown in FIG. 1, the warping (refer to the two-dot chain lines) of the substrate 201 increases and noise generates more easily as a result, due to acting upon the substrate 201 of a tensile force TE (refer to the white arrows) based on the solder fillet 301*a*.

Patent Literature 1 cited below describes a multilayer ceramic capacitor having leg terminals on each external electrode 102 in order to suppress the noise accompanying the electrostriction, but if a solder fillet 301*a* similar to the one shown in FIG. 1 is formed on the end face side of each leg terminal after installation, a tensile force TE (refer to the white arrows in FIG. 1) based on the solder fillet 301*a* still acts upon the substrate 201, although each leg terminal itself does provide an effect of mitigating the transmission of stress to the substrate 201.

Background Art Literatures

[Patent Literature 1] Japanese Patent Laid-open No. 2004-273935

SUMMARY

An object of the present invention is to provide a multilayer capacitor that allows for, with certainty, suppression of noise accompanying electrostriction.

To achieve the aforementioned object, the present invention provides a multilayer ceramic capacitor comprising a dielectric chip made of dielectric ceramics and having a roughly rectangular shape, as well as external electrodes respectively positioned on the opposing ends thereof, where ends of parts of multiple internal electrode layers built into the dielectric chip in a manner not contacting each other are connected to one external electrode, while ends of the other parts are connected to the other external electrode: wherein each of the external electrodes has an end face of roughly rectangular shape covering an end face of the dielectric chip, a side face of roughly quadrangular cylinder shape covering a part of the four side faces of the dielectric chip, and a curved face of roughly arc cross-section present between the end face and side face; and wherein each of the external electrodes has a solder non-adhesion film made of material to which solder does not adhere: (1) in a manner continuously and exclusively covering the entire surface of the end face and the entire surface of the curved face; (2) in a manner continuously and exclusively covering the entire surface of the end face and a part of the curved face; or (3) in a manner exclusively covering the entire surface of the end face. The term "covering the entire surface" refers to covering the entire surface without any pinholes or any exposed areas, covering a surface to the extent that the covered surface is functionally equivalent to the covered entire surface for the purpose(s) disclosed herein, or covering a substantially or nearly entire surface to the degree effective for the purpose(s) disclosed herein. The term "solder non-adhesion film" refers to a film to which solder does not completely, substantially, or materially adhere, stick, or attach when installing a capacitor on a substrate using the solder so that the solder does not migrate upward along the film during heat treatment.

According to the present invention, a multilayer capacitor can be provided that allows for, with certainty, suppression of noise accompanying electrostriction.

The aforementioned and other objects, and characteristics and effects according to each object, of the present invention are made clear by the explanations given below and drawings attached hereto.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

DESCRIPTION OF THE SYMBOLS 10-1, 10-2, 10-3 - - - Multilayer ceramic capacitor, 11 - - - Dielectric chip, 11a - - - Internal electrode layer, 12 - - - External electrode, 12a - - - End face, 12b - - - Side face, 12c - - - Curved face, 13-1, 13-2, 13-3 - - - Solder non-adhesion film.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DETAILED DESCRIPTION OF EMBODIMENTS

First Embodiment

Figure 2:
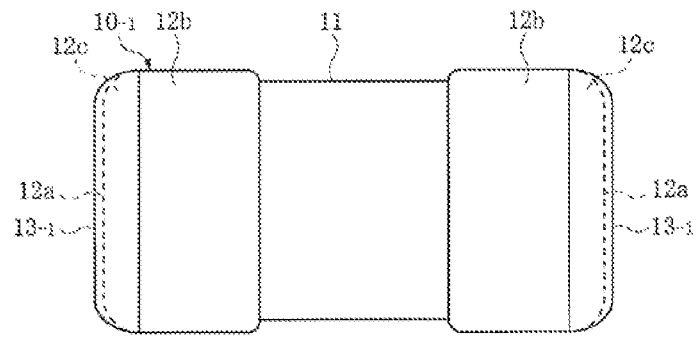
FIG. 2 is a top view of the multilayer ceramic capacitor representing the first embodiment of the present invention.
Figure 3:
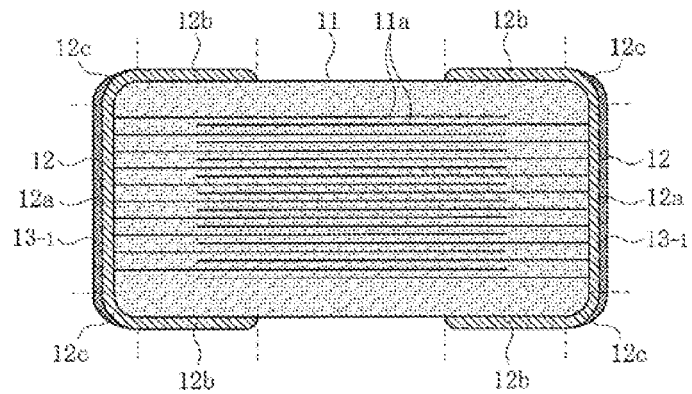
FIG. 3 is a longitudinal section view of the multilayer ceramic capacitor shown in FIG. 2.
Figure 4:
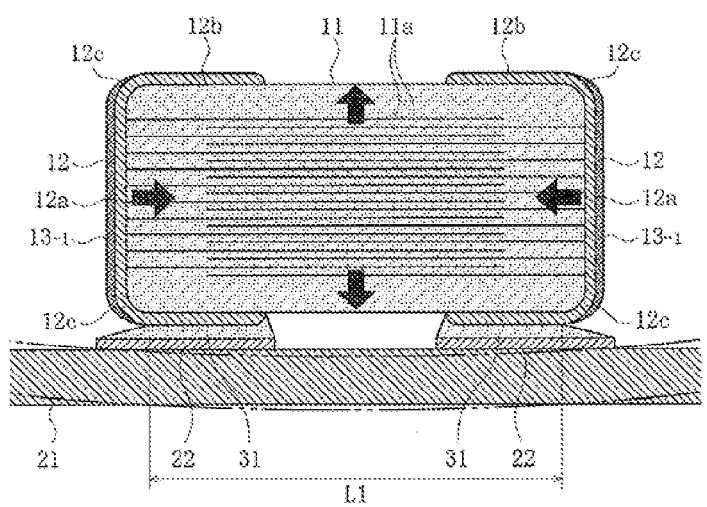
FIG. 4 shows the multilayer ceramic capacitor shown in FIG. 2 as installed on a substrate.

FIGS. 2 to 4

FIG. 2 is a top view of a multilayer ceramic capacitor 10-1, FIG. 3 is a longitudinal section view of the multilayer ceramic capacitor 10-1 shown in FIG. 2, and FIG. 4 shows the multilayer ceramic capacitor 10-1 shown in FIG. 2 as installed on a substrate 21.

In the explanations provided herein, the lateral dimension of the multilayer ceramic capacitor 10-1 in FIGS. 2 and 3 is referred to as "length," while its vertical dimension in FIG. 2 is referred to as "width" and its vertical dimension in FIG. 3 is referred to as "height," for illustration purposes.

As shown in FIG. 2, the multilayer ceramic capacitor 10-1 (hereinafter simply referred to as "capacitor 10-1") has an external electrode 12 on each end, in the length direction, of a dielectric chip 11 (i.e., each opposing end of the dielectric chip 11) made of dielectric ceramics and having a roughly rectangular shape, and forms a roughly rectangular solid shape whose reference dimensions meet the condition "Length>Width=Height" or "Length>Width>Height" as a whole.

As shown in FIG. 3, the dielectric chip 11 has multiple (a total 20 in FIG. 3) built-in internal electrode layers 11a that do not contact each other, where ends of parts of the multiple internal electrode layers 11a (odd-numbered layers from the top) are connected to one (left) external electrode 12, while ends of the other parts (even-numbered layers from the top) are connected to the other (right) external electrode 12. Although the total number of internal electrode layers 11a is 20 in FIG. 3 for illustration purposes, the total number is 100 or more in reality. The dielectric chip 11 is made of barium titanate, strontium titanate, calcium titanate, magnesium titanate, calcium zirconate, calcium zirconate titanate, barium zirconate, titanium oxide or other dielectric ceramics, or preferably dielectric ceramics whose ∈>1000 or dielectric ceramics of Class 2 (having a high dielectric constant), where the layer part present in each pair of internal electrode layers 11a has roughly the same thickness. Each internal electrode layer 11a is made of nickel, copper, palladium, platinum, silver, gold or alloy thereof or other metal, and has roughly the same thickness and same shape in top view (roughly rectangular).

Each external electrode 12 has a two-layer structure comprising a base layer (not illustrated) contacting the dielectric chip 11 and a surface layer (not illustrated) formed on the surface of the base layer, or a multi-layer structure where at least one intermediate layer (not illustrated) is present between the base layer and surface layer. The base layer is made of nickel, copper, palladium, platinum, silver, gold, or alloy thereof or other metal, the surface layer is made of tin, palladium, gold, zinc, or other metal, and the intermediate layer is made of platinum, palladium, gold, copper, nickel, or other metal.

Each external electrode 12 also has three areas whose boundaries correspond to the broken lines in FIG. 3, which are specifically an end face 12a of roughly rectangular shape covering an end face of the dielectric chip 11, a side face 12b of roughly quadrangular cylinder shape covering a part of the four side faces of the dielectric chip 11, and a curved face 12c of roughly arc cross-section present between the end face 12a and side face 12b. To supplement the above, the end face 12a refers to the part covering the surface that specifies the length of the dielectric chip 11, the side face 12b refers to the so-called "wrap-around" part, and the curved face 12c refers to the part whose surface is constituted by a curved surface and which is neither the end face 12a nor side face 12b.

Symbol 13-1 represents a solder non-adhesion film made of material to which solder does not adhere, provided in a manner continuously covering the entire surface of the end face 12a, and entire surface of the curved face 12c, of each external electrode 12. FIG. 3 shows the solder non-adhesion film 13-1 whose thickness is roughly constant over the end face 12a and gradually decreases over the curved face 12c toward the edge, but given the role of the solder non-adhesion film 13-1 as described later, its thickness over the end face 12a need not be roughly constant, while its thickness over the curved face 12c need not gradually decrease toward the edge.

For the material to which solder does not adhere, any insulating material free from metal component can be used favorably, such as: (1) any known solder resist; (2) epoxy resin, phenol resin, polyimide resin, urea resin, melamine resin, unsaturated polyester resin, bis maleimide resin, polyurethane resin, diaryl phthalate resin, silicone resin, cyanate resin, or other thermosetting plastic, or (3) silicon dioxide, aluminum oxide, silicon nitride, or other inorganic insulating material.

If any material in (1) or (2) is used, the solder non-adhesion film 13-1 can be produced by, for example, applying an uncured paste and then thermosetting the applied paste, where such method allows the paste to cure at lower temperatures compared to when high-temperature baking is used. If any material in (3) is used, on the other hand, the solder non-adhesion film 13-1 can be produced by, for example, forming a film according to the sputtering method, deposition method, or other thin film forming method.

To install the capacitor 10-1 shown in FIGS. 2 and 3 on a substrate 21, as shown in FIG. 4, the capacitor 10-1 is installed in such a way that one side (contacting surface of roughly rectangular shape) of the side face 12*b* of each external electrode 12 comes in contact with the solder paste applied to a pad 22 on the substrate 21, after which the solder paste is melted by means of reflow soldering or other method of heat treatment and then cured, to join each external electrode 12 to the pad 22 via the solder 31. Note that the pad 22 on the substrate 21 has a roughly rectangular profile slightly larger than the contacting surface of each external electrode 12.

Figure 1:
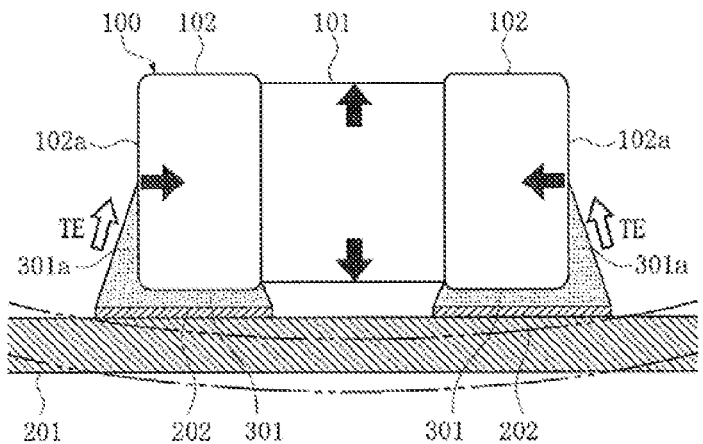
FIG. 1 shows a conventional multilayer ceramic capacitor installed on a substrate.

During the heat treatment, the molten solder paste behaves in a manner rising on the surface of the end face 12*a*, and surface of the side face 12*b* (side face in the width direction), of each external electrode 12, but because the solder non-adhesion film 13-1 made of material to which solder does not adhere is provided in a manner continuously covering the entire surface of the end face 12*a*, and entire surface of the curved face 12*c*, of each external electrode 12, no solder fillet (refer to symbol 301*a* in FIG. 1) is formed on the side face 12*a* side of each external electrode 12 on the installed capacitor 10-1, as shown in FIG. 4.

Accordingly, even if the dielectric chip 11 undergoes electrostriction (i.e., the length of the dielectric chip 11 decreases while its height increases (refer to the black arrows), followed by restoration of the original dimensions, with this process being repeated) due to application of voltage, particularly alternating current voltage, to the installed capacitor 10-1 as shown in FIG. 4, acting upon the substrate 21 of a tensile force TE (refer to the white arrows in FIG. 1) based on such solder fillet can be prevented to reduce warping (refer to the two-dot chain lines) of the substrate 21, and this reduced warping in turn mitigates any vibration generating in the substrate 21 and thereby suppresses, with certainty, noise accompanying electrostriction.

In addition, the solder 31 does not adhere to the solder non-adhesion film 13-1 provided in a manner continuously covering the entire surface of the end face 12*a*, and entire surface of the curved face 12*c*, of each external electrode 12, and therefore in the installed state shown in FIG. 4, the outer edge distance L1 of the solder 31 attached to each external electrode 12 can be shortened to less than the length of the capacitor 10-1, and this shorter outer edge distance L1 reduces warping (refer to the two-dot chain lines) of the substrate 21 further, while this reduced warping further mitigates any vibration generating in the substrate 21, thereby suppressing noise accompanying electrostriction with greater certainty.

Second Embodiment

Figure 5:
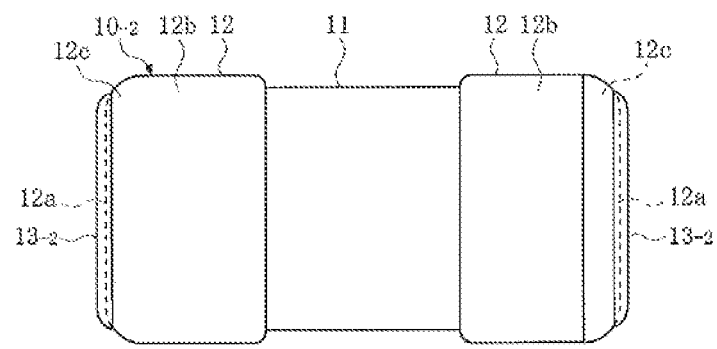
FIG. 5 is a top view of the multilayer ceramic capacitor representing the second embodiment of the present invention.
Figure 6:
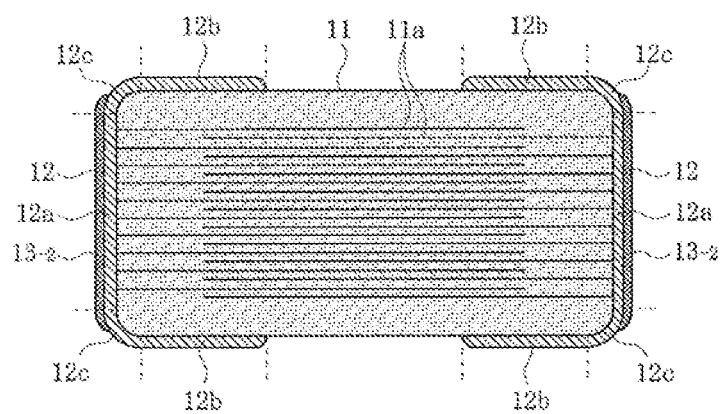
FIG. 6 is a longitudinal section view of the multilayer ceramic capacitor shown in FIG. 5.
Figure 7:
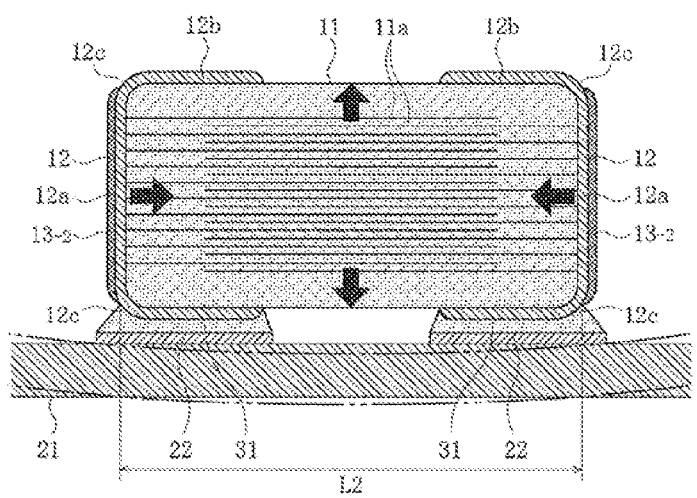
FIG. 7 shows the multilayer ceramic capacitor shown in FIG. 5 as installed on a substrate.

FIGS. 5 to 7

FIG. 5 is a top view of a multilayer ceramic capacitor 10-2, FIG. 6 is a longitudinal section view of the multilayer ceramic capacitor 10-2 shown in FIG. 5, and FIG. 7 shows the multilayer ceramic capacitor 10-2 shown in FIG. 5 as installed on a substrate 21.

In the explanations provided herein, the lateral dimension of the multilayer ceramic capacitor 10-2 in FIGS. 5 and 6 is referred to as "length," while its vertical dimension in FIG. 5 is referred to as "width" and its vertical dimension in FIG. 6 is referred to as "height," for illustration purposes as in [First Embodiment].

The multilayer ceramic capacitor 10-2 (hereinafter simply referred to as "capacitor 10-2") shown in FIGS. 5 and 6 is constitutionally different from the capacitor 10-1 representing the first embodiment in that:

A solder non-adhesion film 13-2 made of material to which solder does not adhere is provided in a manner continuously covering the entire surface of the end face 12*a*, and part (roughly a half in FIG. 6) of the surface of the curved face 12*c*, of each external electrode 12.

FIG. 6 shows the solder non-adhesion film 13-2 whose thickness is roughly constant over the end face 12*a* and gradually decreases over the curved face 12*c* toward the edge, but given the role of the solder non-adhesion film 13-2 as described later, its thickness over the end face 12*a* need not be roughly constant, while its thickness over the curved face 12*c* need not gradually decrease toward the edge.

To install the capacitor 10-2 shown in FIGS. 5 and 6 on a substrate 21, as shown in FIG. 7, the capacitor 10-2 is installed in such a way that one side (contacting surface of roughly rectangular shape) of the side face 12*b* of each external electrode 12 comes in contact with the solder paste applied to a pad 22 on the substrate 21, after which the solder paste is melted by means of reflow soldering or other method of heat treatment and then cured, to join each external electrode 12 to the pad 22 via the solder 31. Note that the pad 22 on the substrate 21 has a roughly rectangular profile slightly larger than the contacting surface of each external electrode 12.

During the heat treatment, the molten solder paste behaves in a manner rising on the surface of the end face 12*a*, and surface of the side face 12*b* (side face in the width direction), of each external electrode 12, but because the solder non-adhesion film 13-2 made of material to which solder does not adhere is provided in a manner continuously covering the entire surface of the end face 12*a*, and part of the surface of the curved face 12*c*, of each external electrode 12, no solder fillet (refer to symbol 301*a* in FIG. 1) is formed on the side face 12*a* side of each external electrode 12 on the installed capacitor 10-2, as shown in FIG. 7.

Accordingly, even if the dielectric chip 11 undergoes electrostriction (i.e., the length of the dielectric chip 11 decreases while its height increases (refer to the black arrows), followed by restoration of the original dimensions, with this process being repeated) due to application of voltage, particularly alternating current voltage, to the installed capacitor 10-2 as shown in FIG. 7, acting upon the substrate 21 of a tensile force TE (refer to the white arrows in FIG. 1) based on such solder fillet can be prevented to reduce warping (refer to the two-dot chain lines) of the substrate 21, and this reduced warping in turn mitigates any vibration generating in the substrate 21 and thereby with certainty suppresses noise accompanying electrostriction.

In addition, the solder 31 does not adhere to the solder non-adhesion film 13-2 provided in a manner continuously covering the entire surface of the end face 12*a*, and part of the surface of the curved face 12*c*, of each external electrode 12, and therefore in the installed state shown in FIG. 7, the outer edge distance L2 of the solder 31 attached to each external electrode 12 can be shortened to less than the length of the capacitor 10-2, and this shorter outer edge distance L2 reduces warping (refer to the two-dot chain lines) of the substrate 21 further, while this reduced warping further mitigates any vibration generating in the substrate 21, thereby suppressing noise accompanying electrostriction with greater certainty.

Furthermore, adhesion of solder 31 to the other parts of the surface of the curved face 12c of each external electrode 12, continuously from the side face 12b, means that the self-alignment effect can be expected from this adhesion of solder 31 to the other parts of the surface of the curved face 12c.

Third Embodiment

Figure 8:
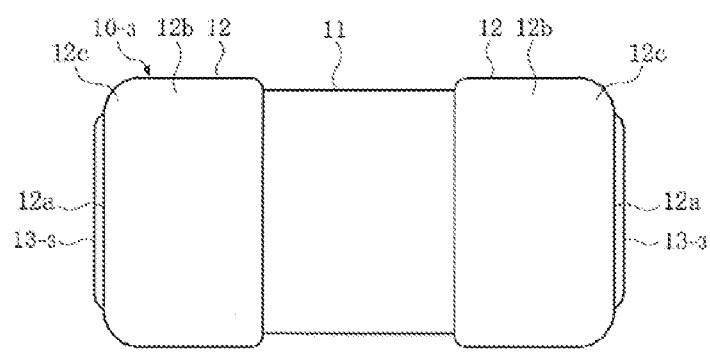
FIG. 8 is a top view of the multilayer ceramic capacitor representing the third embodiment of the present invention.
Figure 9:
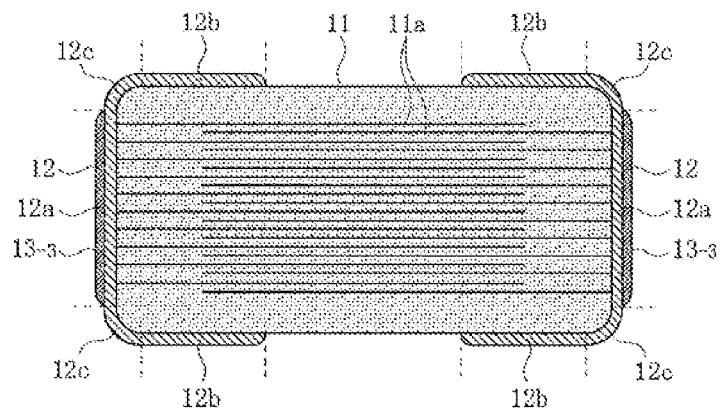
FIG. 9 is a longitudinal section view of the multilayer ceramic capacitor shown in FIG. 8.
Figure 10:
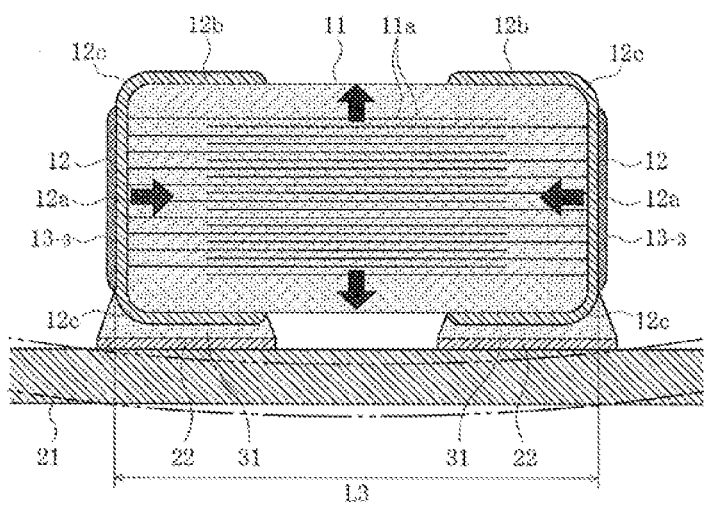
FIG. 10 shows the multilayer ceramic capacitor shown in FIG. 8 as installed on a substrate.

FIGS. 8 to 10

FIG. 8 is a top view of a multilayer ceramic capacitor 10-3, FIG. 9 is a longitudinal section view of the multilayer ceramic capacitor 10-3 shown in FIG. 8, and FIG. 10 shows the multilayer ceramic capacitor 10-3 shown in FIG. 8 as installed on a substrate 21.

In the explanations provided herein, the lateral dimension of the multilayer ceramic capacitor 10-3 in FIGS. 8 and 9 is referred to as "length," while its vertical dimension in FIG. 8 is referred to as "width" and its vertical dimension in FIG. 9 is referred to as "height," for illustration purposes as in [First Embodiment].

The multilayer ceramic capacitor 10-3 (hereinafter simply referred to as "capacitor 10-3") shown in FIGS. 8 and 9 is constitutionally different from the capacitor 10-1 representing the first embodiment in that:

A solder non-adhesion film 13-3 made of material to which solder does not adhere is provided in a manner continuously covering the entire surface of the end face 12a of each external electrode 12.

FIG. 9 shows the solder non-adhesion film 13-3 whose thickness is roughly constant over the end face 12a except for the outer periphery and gradually decreases over the outer periphery toward the edge, but given the role of the solder non-adhesion film 13-3 as described later, its thickness over the end face 12a except for the outer periphery need not be roughly constant, while its thickness over the outer periphery need not gradually decrease toward the edge.

To install the capacitor 10-3 shown in FIGS. 8 and 9 on a substrate 21, as shown in FIG. 10, the capacitor 10-3 is installed in such a way that one side (contacting surface of roughly rectangular shape) of the side face 12b of each external electrode 12 comes in contact with the solder paste applied to a pad 22 on the substrate 21, after which the solder paste is melted by means of reflow soldering or other method of heat treatment and then cured, to join each external electrode 12 to the pad 22 via the solder 31. Note that the pad 22 on the substrate 21 has a roughly rectangular profile slightly larger than the contacting surface of each external electrode 12.

During the heat treatment, the molten solder paste behaves in a manner rising on the surface of the end face 12a, and surface of the side face 12b (side face in the width direction), of each external electrode 12, but because the solder non-adhesion film 13-3 made of material to which solder does not adhere is provided in a manner covering the entire surface of the end face 12a of each external electrode 12, no solder fillet (refer to symbol 301a in FIG. 1) is formed on the side face 12a side of each external electrode 12 on the installed capacitor 10-3, as shown in FIG. 10.

Accordingly, even if the dielectric chip 11 undergoes electrostriction (i.e., the length of the dielectric chip 11 decreases while its height increases (refer to the black arrows), followed by restoration of the original dimensions, with this process being repeated) due to application of voltage, particularly alternating current voltage, to the installed capacitor 10-3 as shown in FIG. 10, acting upon the substrate 21 of a tensile force TE (refer to the white arrows in FIG. 1) based on such solder fillet can be prevented to reduce warping (refer to the two-dot chain lines) of the substrate 21, and this reduced warping in turn mitigates any vibration generating in the substrate 21 and thereby with certainty suppresses noise accompanying electrostriction.

In addition, the solder 31 does not adhere to the solder non-adhesion film 13-3 provided in a manner covering the entire surface of the end face 12a of each external electrode 12, and therefore in the installed state shown in FIG. 10, the outer edge distance L3 of the solder 31 attached to each external electrode 12 can be shortened to less than the length of the capacitor 10-3, and this shorter outer edge distance L3 reduces warping (refer to the two-dot chain lines) of the substrate 21 further, while this reduced warping further mitigates any vibration generating in the substrate 21, thereby suppressing noise accompanying electrostriction with greater certainty.

Furthermore, adhesion of solder 31 to the entire surface of the curved face 12c of each external electrode 12, continuously from the side face 12b, means that the self-alignment effect can be expected from this adhesion of solder 31 to the entire surface of the curved face 12c.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2013-003475, filed Jan. 11, 2013, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor comprising a dielectric chip made of dielectric ceramics and having a roughly rectangular shape, as well as external electrodes respectively positioned on opposing ends thereof, where ends of parts of multiple internal electrode layers built into the dielectric chip in a manner not contacting each other are connected to one external electrode, while ends of the other parts are connected to the other external electrode, wherein:

each of the external electrodes has an end face of roughly rectangular shape covering an end face of the dielectric chip, a side face of roughly quadrangular cylinder shape covering a part of four side faces of the dielectric chip, and a curved face of roughly arc cross-section present between the end face and side face; and each of the external electrodes has a solder non-adhesion film made of material to which solder does not adhere, said solder non-adhesion film continuously and exclusively covering an entire surface of the end face and a part or an entire surface of the curved face without covering the side face wherein a distance between an edge of the solder non-adhesion film on one end of the capacitor and an edge of the solder non-adhesion film on the other end of the capacitor, which corresponds to an outer edge distance of solder to be attached to each external electrode, is shorter than a length of the dielectric chip.

2. A multilayer ceramic capacitor according to claim 1, wherein the material to which solder does not adhere is an insulating material free from metal component.

3. A multilayer ceramic capacitor according to claim 2, wherein the dielectric ceramics is dielectric ceramics whose ∈>1000 or dielectric ceramics of Class 2.

4. A multilayer ceramic capacitor according to claim 3, wherein a total number of the multiple internal electrode layers is 100 or more.

5. A multilayer ceramic capacitor according to claim 2, wherein a total number of the multiple internal electrode layers is 100 or more.

6. A multilayer ceramic capacitor according to claim 1, wherein the dielectric ceramics is dielectric ceramics whose ∈>1000 or dielectric ceramics of Class 2.

7. A multilayer ceramic capacitor according to claim 6, wherein a total number of the multiple internal electrode layers is 100 or more.

8. A multilayer ceramic capacitor according to claim 1, wherein a total number of the multiple internal electrode layers is 100 or more.

* * * * *

UNITED STATES PATENT AND TRADEMARK OFFICE
CERTIFICATE OF CORRECTION

PATENT NO. : 9,318,265 B2  
APPLICATION NO. : 14/142557  
DATED : April 19, 2016  
INVENTOR(S) : Takehiko Kamobe and Katsunosuke Haga Page 1 of 1

It is certified that error appears in the above-identified patent and that said Letters Patent is hereby corrected as shown below:

In the specification,

At column 4, line 17, in "whose E> 1000 or dielectric", please delete "∈" and insert therefor --ε--.

In the claims,

At column 10, line 3, in Claim 3, "whose E> 1000 or dielectric", please delete "∈" and insert therefor --ε--.

At column 10, line 12, in Claim 6, "whose E> 1000 or dielectric", please delete "∈" and insert therefor --ε--.

Signed and Sealed this  
Twenty-first Day of June, 2016

Michelle K. Lee  
*Director of the United States Patent and Trademark Office*